Sept. 10, 1963 H. E. PRUSS 3,103,288
BULK-HAULING DUMP VEHICLES
Filed Oct. 31, 1961 2 Sheets-Sheet 1
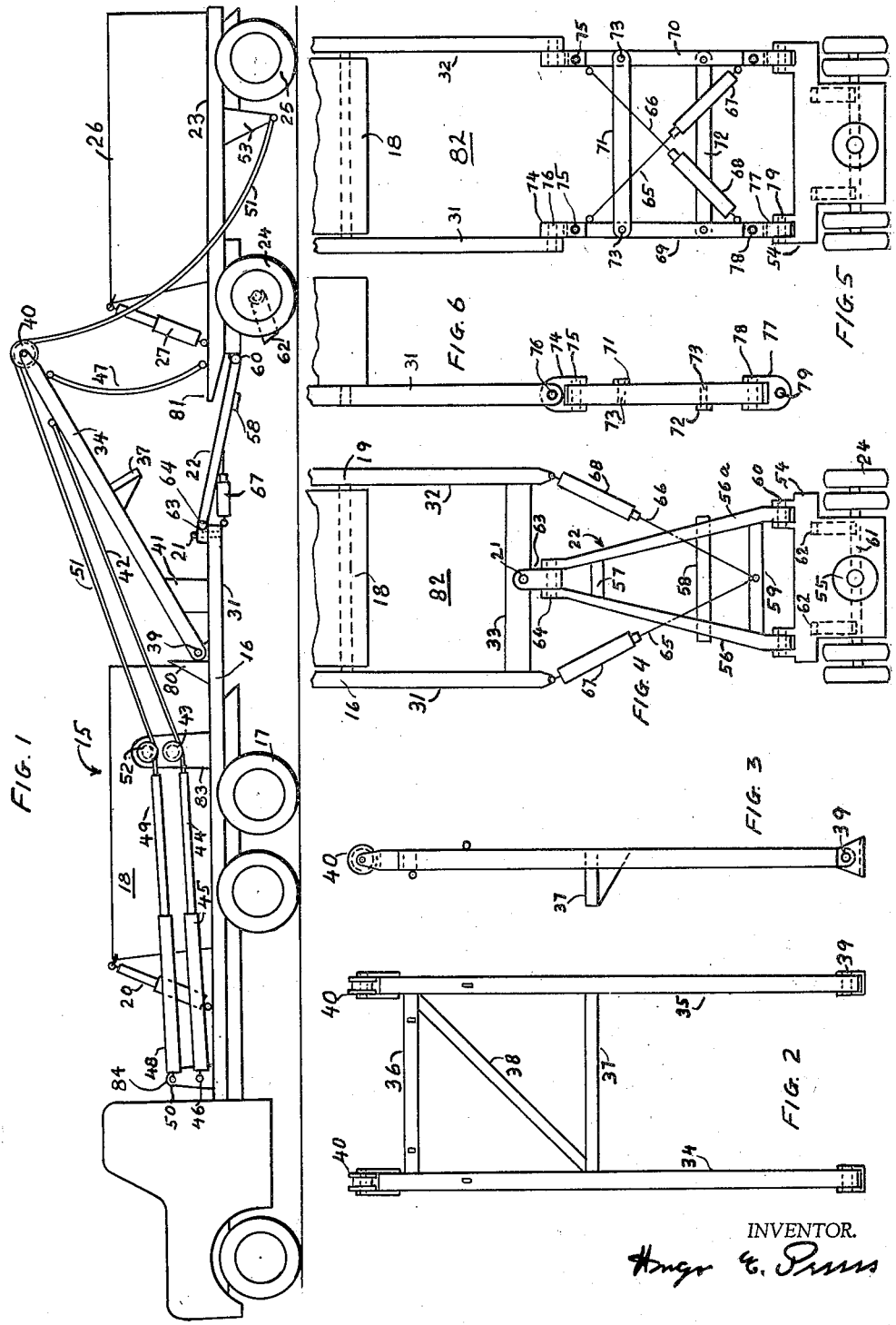
INVENTOR.
Hugo E. Pruss

3,103,288
BULK-HAULING DUMP VEHICLES
Hugo E. Pruss, Orinda, Calif., assignor of fifteen percent to Oswald H. Milmore, Piedmont, Calif.
Filed Oct. 31, 1961, Ser. No. 149,010
20 Claims. (Cl. 214—44)

The invention relates to bulk-hauling vehicles having tiltable dumping bodies and is, more particularly, concerned with the combination of a trailer and a towing vehicle, both equipped with dumping bodies, and with said vehicle individually when adapted for use in said combination. The said towing vehicle may be an automotive tractor or a semi-trailer which can be attached to such a tractor.

The maximum load that can be carried by highway vehicles, as limited by various statutes and regulations, cannot be fully exploited by available equipment. Generally, greater loads are permitted with longer vehicles; however, a single rearwardly discharging dumping body of requisite length would render the vehicle top-heavy and subject it to the danger of being upset. On the other hand, prior attempts to overcome this difficulty by using one rearwardly or forwardly dumping body on the towing vehicle and another on a trailer (see U.S. Patent to Hockensmith, No. 2,770,490) lead to difficulties in discharging the load, especially when large rocks are hauled, in that the trailer cannot be pulled forwardly over the load dumped by the forward dumping body. This has made it necessary to uncouple the trailer or to resort to inconvenient expedients for moving the load out of the way of the trailer.

Further, known vehicle-trailer combinations having rearwardly discharging dumping bodies are subject to the limitation that the loads from the towing vehicle can often not be dumped where desired, such as on or immediately adjacent to the load dumped from the trailer or into a chasm or pit without first uncoupling the trailer.

It is the general object of this invention to increase the load that can be carried by dumping vehicles while avoiding the hazard of top-heaviness and the inconvenience of uncoupling the trailer at the discharge site while yet retaining the desirable feature of dumping the load rearwardly from the vehicle and, in the preferred embodiment, also from the trailer.

A particular object is to provide a towing vehicle having running wheels and a rearwardly discharging dumping body which is adapted to pull a trailer also having running wheels, said vehicle being constructed so that it can lift the said trailer bodily off the ground and can thereafter be moved about on the vehicle wheels while the trailer is held in raised position, whereby the vehicle can be maneuvered without uncoupling the trailer and yet without the limitations otherwise imposed by the trailer running wheels, the principal of said limitations being: the difficulty or impossibility of pulling the trailer forwards over the load dumped by the vehicle or of backing the trailer over its own rearwardly discharged load to permit the vehicle load to be dumped near the trailer load, and the impossibility of backing the vehicle with the trailer coupled thereto to the edge of a chasm or pit into which it is desired to dump the vehicle load and which does not afford a trackway for the trailer wheels.

A further object is to provide a vehicle-trailer combination, each unit having running wheels and an independent tiltable dumping body, that on the vehicle and, preferably, both bodies being rearwardly discharging, wherein the vehicle and trailer are constructed so that the trailer can be lifted bodily off the ground from the vehicle while the trailer extends rearwards from the vehicle and the vehicle load can be dumped and the vehicle can be maneuvered on its own wheels while the trailer is supported, without the limitations noted in the preceding paragraph.

A specific object is to provide a towing vehicle which is capable of lifting a trailer bodily off the ground, said vehicle including a hinged boom which can be secured to the trailer to raise at least the front end of the trailer as the boom is swung forwards. A more specific object is to provide a mechanism for raising the trailer in two steps, first raising the front end by said boom while the rear trailer wheels remain on the ground, and thereafter raising the rear end of the trailer (if desired simultaneously with continued movement of the boom) by a cable which extends through a guide on the boom and can be attached to a rear part of the trailer.

Another specific object is to provide a trailer drawbar which is pivotally mounted to the trailer and vehicle for movement in the vertical longitudinal plane of the vehicle to guide the front end of the trailer into proper position relatively to the vehicle as the trailer is raised. Ancillary thereto, it is an object to provide means for stabilizing the drawbar against lateral pivotal motion when the trailer is raised.

Still another specific object is to construct the vehicle frame so that the vehicle load can be dumped while the trailer is coupled thereto, either on the ground or raised above the ground.

Still additional objects will become apparent from the following detailed description.

In summary, the towing vehicle—whether a motor truck or a semi-trailer—has a rearwardly discharging dumping body and coupling means situated to the rear of said body for attachment of a trailer drawbar and is provided with elevating means, such as a boom hinged to the vehicle chassis, for lifting the trailer bodily off the ground after the trailer load has been discharged.

According to a preferred embodiment the boom is connected by a tie member to the front end of the trailer, which is further connected to the vehicle coupler by a drawbar that has pivotal connections at its ends for movement in a vertical longitudinal plane, whereby the rear end of the drawbar is tilted upward and the front end of the trailer describes an arc about the vehicle coupler as the boom is swung forwards, the rear end of the trailer remaining on the ground. The elevating means further includes a cable extending through a cable guide on the boom and attached to a rear part of the trailer for raising the rear end of the trailer by drawing the cable forwards after the front of the trailer has been raised.

Preferably, the trailer has an abutment at the front for engagement with the rear side of the drawbar, thereby to limit angular motion between the drawbar and the trailer, and this serves to stabilize the trailer while the rear end is being raised. Further, the boom advantageously has an upwardly directed shelf or abutment on the rear side thereof for engagement by the front of the trailer, thereby further providing stability for the raised trailer.

Because the drawbar is necessarily constructed to permit horizontal pivotal action at the vehicle coupler so as to steer the trailer while towed on a road, the drawbar is preferably further provided with means for immobilizing this horizontal action when the trailer is being raised or lowered. In one embodiment this means comprises a pair of tension members disposed angularly with respect to each other and connected between the vehicle frame and the drawbar, each said member having means such as a hydraulic cylinder and piston for selectively applying tension to the respective member or releasing the member for extension, whereby, when said members are contracted, one prevents rotational motion of the drawbar in one direction and the other in the other direction, and free motion in both directions is permitted when tension on said members is released to permit elongation thereof.

The invention will be further described with reference to the accompanying drawings forming a part of this specification and showing certain preferred embodiments by way of illustration, wherein:

FIGURE 1 is an elevation of a truck and trailer constructed according to the invention and shown in travelling position;

FIGURE 2 is a plan view of the hinged boom;

FIGURE 3 is a side view of the boom of FIGURE 2;

FIGURE 4 is a plan view of the drawbar, parts of the truck and trailer being shown;

FIGURE 5 is a plan view of a drawbar according to a modified construction wherein two parallel bars are used;

FIGURE 6 is a fragmentary side view of the drawbar of FIGURE 5;

Figure 9:
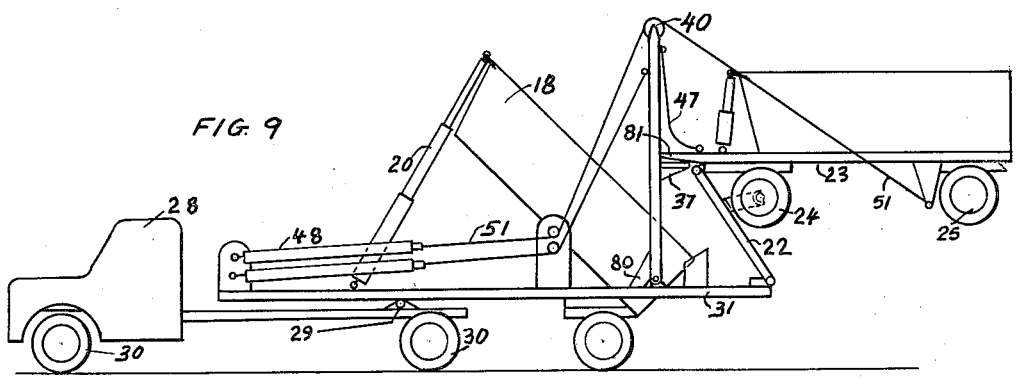
FIGURE 9 is an elevation of the same combination, showing the trailer in fully raised position and the vehicle dumping body in discharging position.
Figure 10:
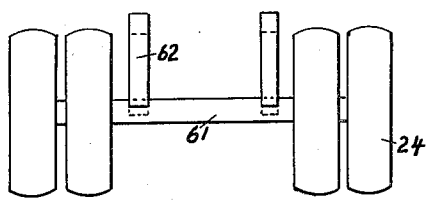
FIGURE 10 is a plan of the front axle of the trailer.

Referring to FIGURE 1, there is shown an automotive truck 15 which is the towing vehicle and includes a chassis frame 16, running wheels 17, and a dumping body 18 which has a dumping gate (not shown) hinged at the top at the rear of the body, said body being pivotally mounted at its rear end to the chassis frame as shown at 19 in FIGURE 4, for discharging its bulk load rearwardly when the front part of the body is tilted upwardly to the position shown in FIGURE 9 by suitable power mechanism, such as a hydraulic ram 20 provided on each side and pivotally connected to the dumping body and frame. The truck is connected by a coupling pin 21 to the drawbar 22 of a full trailer which includes a trailer chassis frame 23, front and rear running wheels 24 and 25, respectively, and a dumping body 26 which is pivotally mounted at its rear end to the frame 23 and has a gate as described for the body 18, for discharging its load rearwardly when the front end thereof is tilted upwards by a suitable power mechanism, such as a hydraulic ram 27 provided on each side.

Figure 7:
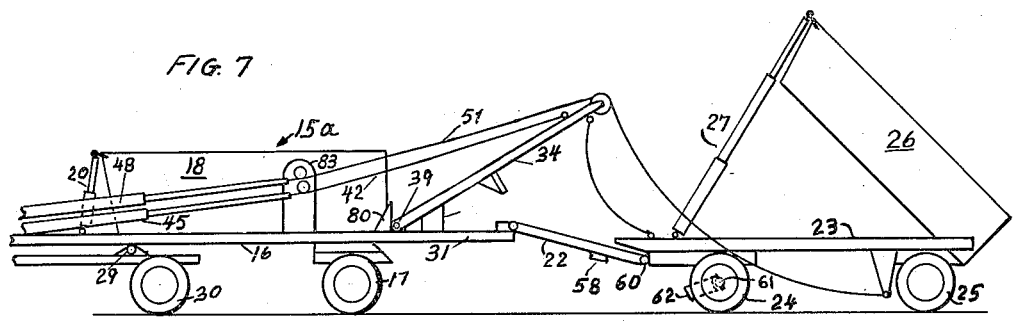
FIGURE 7 is an elevation of a vehicle-trailer combination showing the trailer load being discharged, the vehicle differing from in FIGURE 1 in being a semi-trailer.
Figure 8:
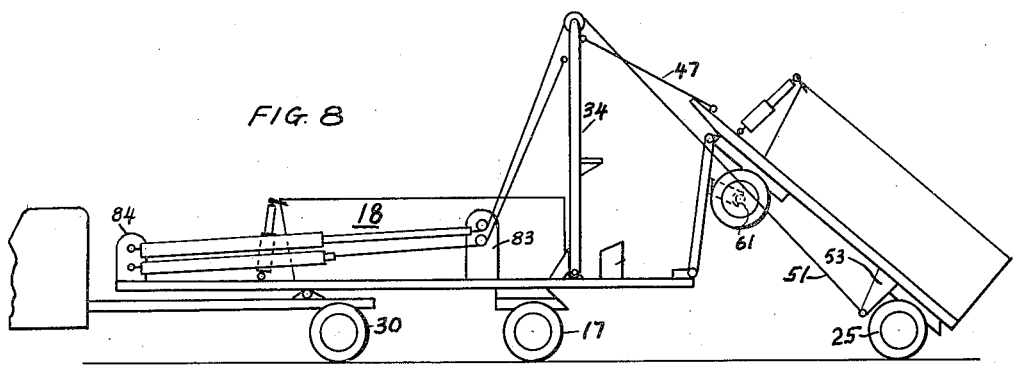
FIGURE 8 is an elevation of the combination of FIGURE 7, showing the first step in raising the trailer.

As is illustrated in FIGURES 7-9, the towing vehicle may be a semi-trailer 15a, constructed as described herein for the truck 15 save that it is provided with running wheels 17 only at the rear and is supported at the front by a motor truck 28 to which it is secured by a fifth wheel 29. The truck has running wheels 30. The term "vehicle" is herein used generically to include any towing vehicle for the trailer, such as the truck 15 and the semi-trailer 15a.

The vehicle frame 16 includes a frame extension projecting rearwardly from the dumping body 18 and appearing in plan in FIGURE 4. The extension consists of laterally spaced side members 31, 32, which are rigid with respect to, e.g., integral extensions of or removably attached to the chassis frame 16 and are united at their rear extremities by a cross bar 33 to which the vertical coupling pin 21 is secured midway between the side members. The latter are spaced apart to provide a large, open dumping space 82 forwardly of the cross bar 33 through which bulk material from the body 18 can fall.

The vehicle frame carries a hinged boom (further shown in FIGURES 2 and 3) which comprises a frame formed of parallel beams 34, 35, which are rigidly interconnected by upper and intermediate cross members 36 and 37, respectively, and a diagonal brace 38. The cross member 37 projects rearwardly from the beams 36 and 37 along the full length of the brace to form an upwardly directed abutment for supporting the front end of the trailer, as will appear and is shown in FIGURE 9. These beams are pivotally mounted on the vehicle frame on a transverse axis by pins 39 and carry cable guides, such as idler pulleys 40, at their extremities. The chassis frame carries a support 41 on which the boom rests when in its normal position, which is lowered and projecting rearwards as is shown in FIGURES 1 and 7. A rigid stop 80 on the frame limits forward swinging motion of the boom. Each of the beams 34 and 35 is connected to a cable, of which only the left cable 42 appears. Said cables extend under idler pulleys 43 carried by the frame standards 83 and are connected to piston rods 44. Each piston rod is reciprocable in a hydraulic cylinder 46 mounted on the frame by a standard 84. When hydraulic fluid under pressure is admitted to the cylinders 45 the pistons 44 are pulled forward, thereby drawing the cables 42 and boom forwards to swing the boom to the position of FIGURE 8. A pair of tension members, e.g., chains or steel cables 47, situated one on each side, interconnect the outer part of the boom to the front part of the trailer, to exert an upward and forward pull at each side of the trailer. These tension members are normally slack, as appears in FIGURES 1, 7 and 9. The vehicle frame further carries, at each side, a hydraulic cylinder 48 carrying a piston 49, the cylinders being secured to the frame at 50. Each piston is fixed to a steel cable 51 which extends rearwardly under an idler pulley 52 carried by the vehicle frame and about one of the idler pulleys 40 on the boom and has the rear end secured to a rear part of the trailer by a bracket 53. The cable 51 is used to raise the rear end of the trailer, as will appear.

The trailer includes an axle tree or dolly platform 54, shown in plan in FIGURE 4, which carries the axle to which the front wheels 24 are journalled. The axle tree supports the front end of the trailer frame, to which it is secured about a vertical pivot at 55. The drawbar 22 is formed as a rigid frame which includes a pair of rearwardly diverging side members 56, 56a, joined by cross members 57, 58 and 59 and pivotally connected to the front of the axle tree 54 on a transverse axis by pins 60. The front axle 61 carries a pair of laterally spaced, forwardly and downwardly projecting abutments 62 which are positioned to engage the cross member 58 of the drawbar and thereby limit tilting of the drawbar on the pins 60 to the angular position shown in FIGURES 8 and 9. The front end of the drawbar carries a link 63 which is pivoted to the drawbar by a transverse pin 64. The link 63 can swivel on the coupling pin 21 for horizontal movement of the drawbar incident to steering the trailer.

The drawbar can be immobilized against pivotal motion about the pin 21 by a pair of tension members 65, 66, such as chains or steel cables, which extend divergently forward from the cross member 59 to different sides of the vehicle frame. Each said tension member has a contractible, hydraulic cylinder-piston combination 67 or 68 interposed therein for tensioning said members. When hydraulic fluid under pressure is admitted to these cylinders the tension members are shortened and drawn taut, so that the member 65 prevents counter-clockwise rotation of the drawbar about the pin 21 and the member 66 prevents rotation in the clockwise direction. The lengths of these members are such that the drawbar is centered when both cylinders are pressurized. When pressure is relieved the tension members are freed for elongation to permit free rotation of the drawbar in either direction.

FIGURES 5 and 6 show a modified drawbar construction which includes a pair of parallel, laterally spaced bars 69 and 70, interconnected by parallel transverse bars 71 and 72 which have pivotal connections at their ends to the bars 69 and 70 at 73. Each bar 69 and 70 has a link 74 pivoted by a vertical pin 75 at the front end and each link is, in turn, pivotally connected to the rear end of the vehicle frame by a horizontal pin 76 which pins, in this embodiment, are the coupling means corresponding to the pin 21. Each side bar further has, at its rear extremity, a link 77 pivotally attached thereto by a vertical pin 78 and each link 77 is pivotally connected to the front of the axle tree platform 54 by a horizontal pin 79. It is evident that this drawbar is movable to tilt the rear end thereof upward as described for the first embodiment, and that its cross bar 72 similarly coacts with the abutments 62 to limit the extent of angular motion relatively to the trailer. It is articulated in the horizontal plane by pivotal motion about the vertical pins 73, 75 and 78. To immobilize the drawbar against the last-mentioned motion while the trailer is being raised or lowered, tension members 65 and 66, equipped with hydraulic cylinder-piston combinations 67, 68, as previously described, are connected diagonally in crossing relation between the bars 69 and 70. Further accessories to insure good tracking of the trailer are not further described herein because they are not germane to the invention, it being understood that this embodiment is included merely to show that the invention can be applied to trailers having parallelogram type of drawbars.

For the sake of simplicity the several conduits, usually flexible, by which hydraulic fluid under pressure is admitted selectively to the several cylinders 20, 27, 45, 50, 67 and 68 and returned to a reservoir are not shown. Such conduits and their control and pumping system are well known. One suitable system is described in applicant's copending U.S. application Serial Number 127,769, filed June 2, 1961.

Operation

Use of the invention will be described with reference to FIGURES 7–9.

The first step in discharging the load, illustrated in FIGURE 7, involves tilting the trailer dumping body 26 by means of the hydraulic rams 27 to discharge the trailer load rearwards.

The second step involves raising the emptied trailer. The first stage of this step, shown in FIGURE 8, involves immobilizing the drawbar against lateral motion by admitting hydraulic fluid to the cylinders 67 and 68. Hydraulic fluid is next admitted to the cylinders 45 to pull the cables 42 forwards, thereby swinging the boom 34—35 upwards and forwards about the pins 39 to hoist the front end of the trailer by the tension members 47 while the rear trailer wheels 25 remain on the ground. During this movement the drawbar 22 pivots about the pins 60 and 64, whereby the former describes an arc about the latter and trailer dolly or axle tree 54 is pulled forwardly and stabilized. This causes a forward movement of the trailer, which is desirable to decrease the rearward projection when in raised position. At the end of the forward movement of the boom it engages abutment stops 80 which are mounted on the vehicle frame. Also at the end of this stage the abutments 62 on the front of the trailer axle engage the rear face of the cross member 58 of the drawbar.

The second stage of the second step involves raising the rear end of the trailer to the level of its front end, as is shown in FIGURE 9. Hydraulic fluid under pressure is admitted to the cylinders 48, thereby pulling the cables 51 forwards over the idler pulleys 40 on the raised boom and applying a forward pull on the trailer by its brackets 53. This pulls the trailer forwards, pressing by its abutments 62 against the drawbar and causing the latter and the trailer to swing forward as a unit about the pins 64. At the end of this swinging movement the front end 81 of the trailer slides over the abutment or brace 37 and engages the rear face of the boom to stop the movement. Engagement with the abutment and boom occurs at both sides of the trailer, whereby the abutment stabilizes the trailer against tilting on a longitudinal axis and the boom stabilizes it against lateral swinging in the horizontal plane. The trailer is thereby secured and the vehicle, carrying the raised trailer, can be maneuvered on the ground as desired, e.g., backed up to discharge its load into a chasm or pit or next to the load dumped from the trailer, or moved forwardly, after discharging its own load, to carry the trailer over the last-mentioned load on the ground.

The third step involves discharging the load from the vehicle by tilting the dumping body 18 by means of the hydraulic rams 20, as shown in FIGURE 9. The bulk material drops through the dumping space 82, in front of the cross bar 33, making it possible to dump the load while the trailer is coupled to the vehicle and is either in the raised position shown or on the ground, in the position shown in FIGURES 1 and 7.

I claim:
1. The method of discharge bulk material from a vehicle-trailer combination, said vehicle and trailer each having ground-engaging wheels and a rearwardly dumping body, which method comprises the steps of:
   (a) first discharging said material rearwards from the trailer by tilting its dumping body while at least some of the trailer wheels are on the ground and the trailer is coupled to said vehicle,
   (b) raising the trailer bodily solely by support from said vehicle sufficiently to lift all trailer wheels clear of the ground, and
   (c) discharging said material rearwardly from the vehicle by tilting its dumping body while said trailer is raised.

2. In combination with the steps defined in claim 1, the step of moving said vehicle and trailer rearwards while the emptied trailer is raised and before discharging said material from the vehicle.

3. The method defined in claim 1 wherein step (b) includes the operations of:
   (a) hoisting the front end of the trailer from the vehicle while a rear part of the trailer remains in engagement with the ground, and
   (b) thereafter tilting the trailer to substantially horizontal position by raising the rear part thereof to approximately the level of the front end thereof.

4. A bulk-hauling and dumping road vehicle adapted to pull a bulk-hauling and dumping trailer and to raise the said trailer bodily off the ground while extending rearwards from the vehicle, said vehicle comprising:
   (a) a chassis including a frame, ground-engaging wheels, and a dumping body mounted on said frame for rearward tilting motion,
   (b) coupling means at the rear of said frame for attachment to a coupling element of said trailer, and
   (c) means on said chassis for lifting said trailer bodily off the ground and supporting the trailer rearwardly of said vehicle.

5. The vehicle defined in claim 4 wherein said frame includes side members extending in laterally spaced relation rearwardly from said dumping body and providing an open dumping space therebetween, said coupling means being situated at the rear of said space and supported by said side members, whereby a load from said dumping body can be discharged through said space while the trailer is raised.

6. The vehicle defined in claim 4 wherein the means (c) includes:
   (a) a boom hinged to said frame for swinging motion fore and aft and adapted to be attached to the trailer, and
   (b) power means on said vehicle for swinging said boom forwardly, thereby to raise the trailer attached thereto.

7. The vehicle defined in claim 6 wherein said boom includes:
   (a) cable guide means near the extremity thereof,
   (b) a cable extending from said frame through said guide means and thence rearwards for attachment to a rear part of the trailer, and (c) power means on the vehicle, independent of the said means (b) of claim 6, for pulling said cable forwards.

8. The vehicle defined in claim 7 wherein said boom includes an upwardly directed abutment at the rear side thereof for engagement by a front part of said trailer to be supported by said abutment.

9. The combination of a road vehicle and a trailer for bulk-hauling on and dumping from both while united, which comprises:
   (a) a road vehicle including a vehicle chassis frame, ground-engaging running wheels, and a dumping body mounted on said frame for rearward tilting motion to dump its load,
   (b) coupling means on said frame situated rearwardly of said dumping body,
   (c) a trailer including a trailer chassis frame, ground-engaging running wheels, and a rearwardly dumping body mounted on said trailer frame,
   (d) a drawbar on said trailer frame connected to said coupling means, and
   (e) means on said vehicle for raising said trailer bodily off the ground and supporting the trailer in raised position from the vehicle while in rear thereof,
whereby the vericle and the trailer supported thereby can be moved on the vehicle running wheels.

10. The combination defined in claim 9 wherein said drawbar is connected pivotally to the vehicle and trailer frames for tilting motion in the longitudinal vertical plane of the vehicle between a substantially horizontal position when said trailer wheels are on the ground and an upright position with the rear end of the drawbar above said coupling means.

11. In combination with the elements according to claim 10, abutment means on the trailer positioned to engage the said drawbar between the pivotally connected ends thereof when the drawbar is tilted towards upright position to limit pivotal motion between the drawbar and trailer.

12. The combination defined in claim 9 wherein the means (e) includes:
   (a) a boom hinged to said vehicle frame for movement between a lowered position extending rearwardly from the hinged end thereof and an upright position,
   (b) means connecting said boom to the trailer for raising at least the front end of the trailer as the boom is moved to upright position, and
   (c) power means on said vehicle for swinging said boom upwards and forwardly, thereby to raise at least the front end of the trailer.

13. The combination defined in claim 9 wherein:
   (a) the drawbar is pivotally connected to the vehicle and trailer frames for tilting movement in the vertical longitudinal plane of the vehicle, and
   (b) the means (e) of claim 9 includes
      (1) a boom hinged to said vehicle frame for movement between a lowered position extending rearwardly from the hinged end thereof and an upright position,
      (2) tension means interconnecting the boom and the front end of the trailer for raising said front end as the boom is raised,
      (3) power means on said vehicle for swinging said boom upwards and forwards from said lowered position, thereby raising said front end,
      (4) cable guide means on the boom situated outwardly from the hinged end thereof,
      (5) a cable extending from said vehicle frame through said guide means and thence rearwardly to a rear part of the trailer and fastened thereto, and
      (6) power means on the vehicle, independent of the means (3) above, for pulling said cable forwards and thereby raising the rear end of the trailer,
whereby the front end of the trailer can be raised and said drawbar simultaneously tilted by swinging said boom upwards while a rear part of the trailer remains on the ground, and the rear end of the trailer can thereafter be raised by the power means of (b) (6), above.

14. The combination defined in claim 13 wherein said boom includes an upwardly directed abutment at the rear side thereof positioned for engagement by a front part of said trailer for support of the latter by the boom when the trailer is raised.

15. The combination defined in claim 13 wherein the trailer includes abutment means at the front thereof positioned to engage the under side of said drawbar between the pivotally connected ends thereof when the drawbar is tilted, to limit pivotal motion between the drawbar and the trailer.

16. The combination defined in claim 9 wherein said vehicle chassis frame includes a pair of rigid members extending rearwardly from the vehicle dumping body in laterally spaced relation to provide an intervening, open dumping space, said coupling means being mounted at the rear ends of said members, whereby the bulk load from the vehicle dumping body can be discharged through said dumping space while the trailer is raised.

17. The combination defined in claim 9 wherein:
   (a) said drawbar is connected at the front end thereof to said coupling means about a pivot which affords horizontal swinging motion of the drawbar when the trailer is lowered,
   (b) the combination includes means for securing said drawbar against said horizontal pivotal motion when said trailer is raised, and
   (c) means for releasing said securing means to permit said horizontal pivotal motion when the trailer is lowered.

18. The combination defined in claim 17 wherein said securing means and releasing means includes:
   (a) a pair of tension members angularly disposed with respect to each other and extending between the drawbar and the vehicle chassis frame, and
   (b) hydraulic means for selectively
      (1) applying tension to said tension members and
      (2) releasing said tension members for elongation.

19. The combination defined in claim 17 wherein said drawbar includes a rigid frame which is connected to said coupling means by a single pivotal connection which affords motion about a vertical axis when the trailer is lowered.

20. The combination defined in claim 17 wherein said drawbar includes a pair of parallel, laterally spaced, rigid bars and said coupling means includes a pair of laterally spaced elements connected respectively to the front ends of said bars and affording motion about vertical axes when the trailer is lowered.

No references cited.